April 10, 1962 J. E. WHEELER 3,028,639
AIRCRAFT HANGER DOORS
Filed May 4, 1959 2 Sheets-Sheet 1
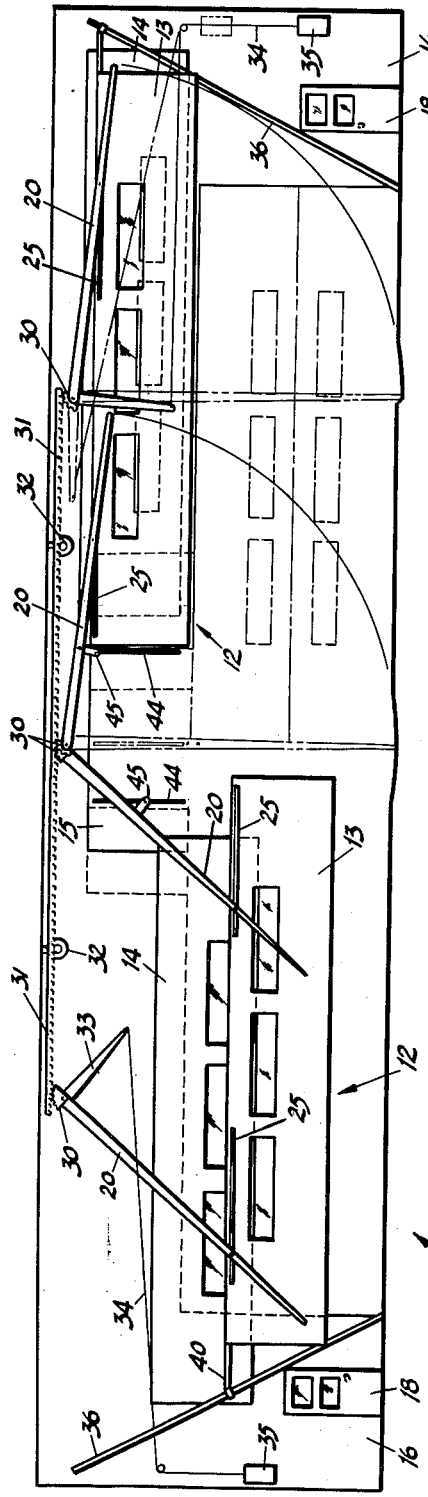
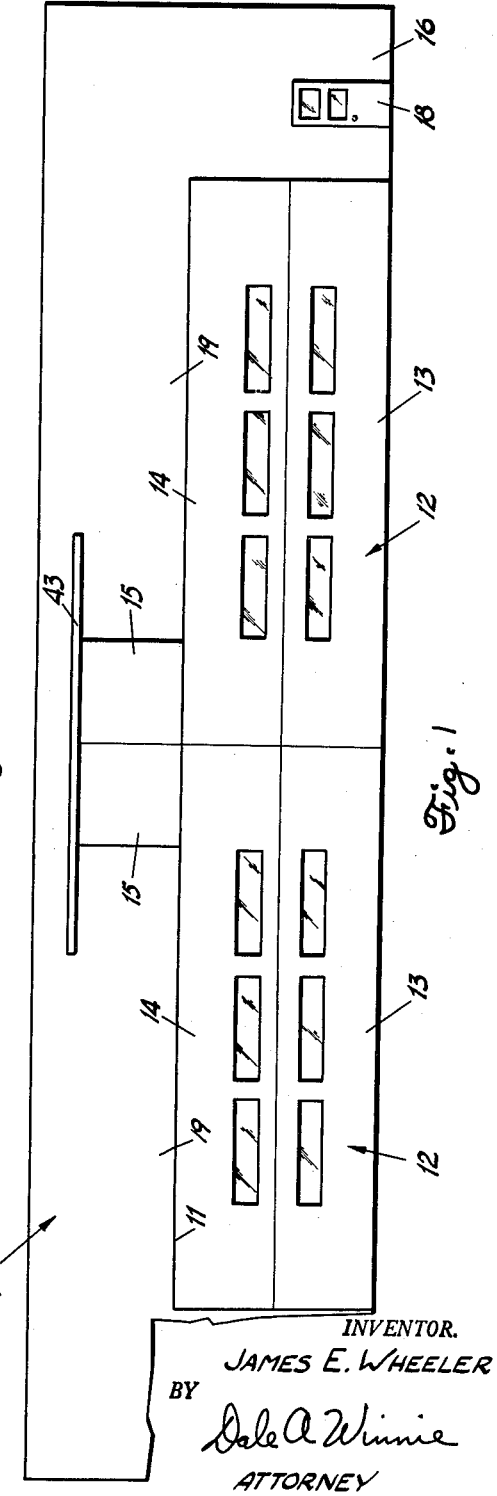
INVENTOR.
JAMES E. WHEELER
BY
Dale A. Winnie
ATTORNEY April 10, 1962  J. E. WHEELER  3,028,639
AIRCRAFT HANGER DOORS
Filed May 4, 1959  2 Sheets-Sheet 2
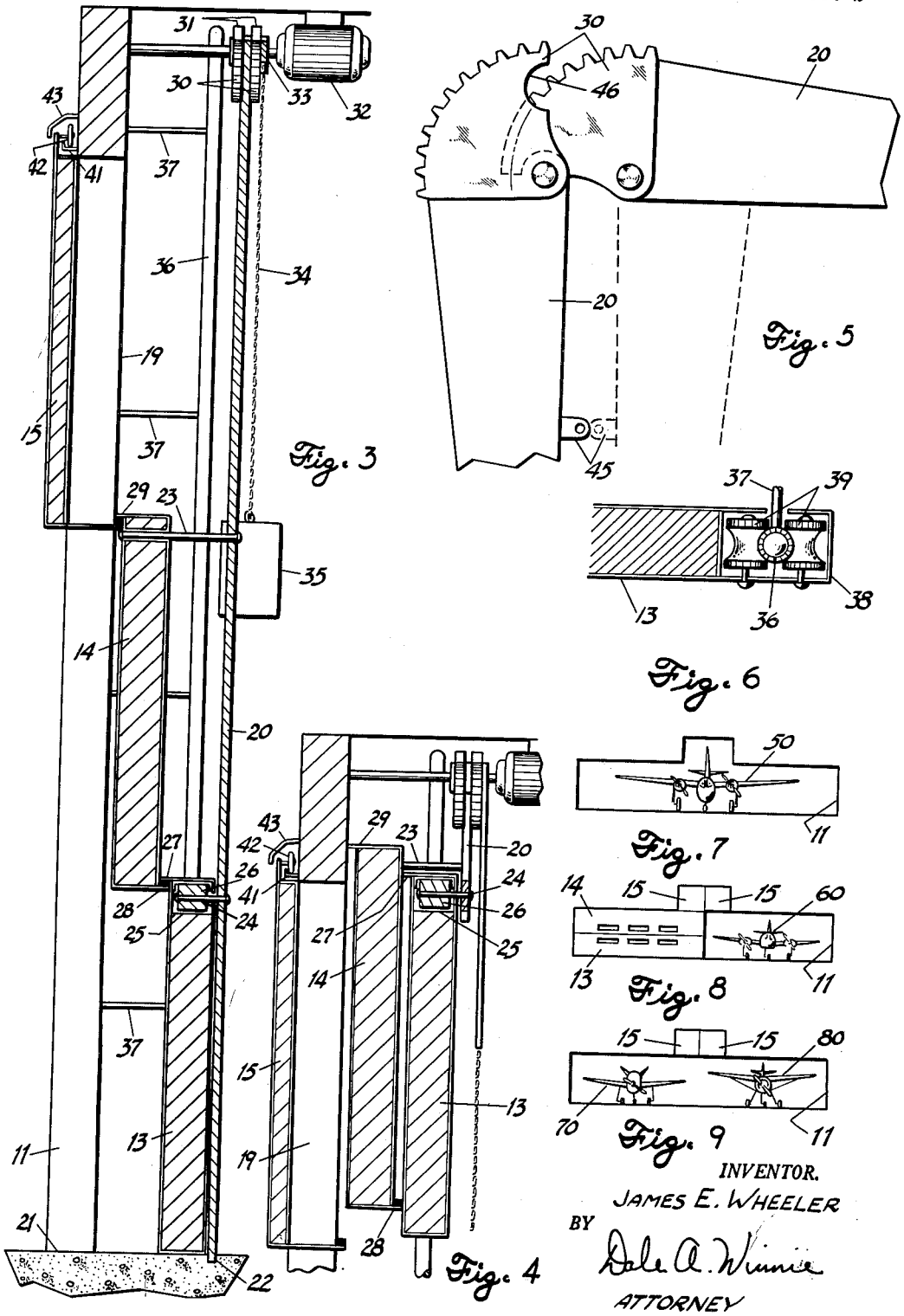
INVENTOR.
JAMES E. WHEELER
BY
Dale A. Winnie
ATTORNEY United States Patent Office 3,028,639
Patented Apr. 10, 1962

3,028,639
AIRCRAFT HANGER DOORS
James E. Wheeler, 2256 Kent Blvd. NE.,
Grand Rapids, Mich.
Filed May 4, 1959, Ser. No. 810,709
10 Claims. (Cl. 20—19)

This invention relates to aircraft hangers in general, and more particularly to hanger doors for opening and closing a large access opening therein.

Aircraft hangers require an access thereto which is large enough to accommodate the largest plane expected to be housed therein. However, too frequently the hanger will be used for smaller aircraft than the largest that can be accommodated. Accordingly, a larger than necessary opening is usually required to be opened each time one of the smaller craft is moved from or into the hanger.

Previous attempts have been made to devise a double set of hanger doors so that only half of the hanger space need be opened at any one time when that is all that is required. Such doors have been of the outwardly swinging, side and overhead type, of the lateral sliding type, or of the multiple sectioned side opening and folding type. Each of these door types has certain disadvantages; including exposure to wind forces, consumption of needed hanger space, susceptibility to ice and snow, etc. Further, it will be appreciated that such double door arrangements usually open a space of greater height than a small craft would require. With large airplanes this height is necessary for tail clearance, but with a small airplane of half the wing span the tail clearance requirement is likewise reduced.

It is an object of this invention to disclose a novel form of aircraft hanger opening and a suitable hanger door arrangement for use therewith.

It is also an object of this invention to disclose an arrangement of aircraft hanger doors providing multiple combinations of openings to said hanger.

Another object of this invention is to disclose a new and novel arrangement of overhead opening hanger doors and such as move in the general plane of the opening.

Still another object of this invention is to disclose overhead opening hanger doors which are in multiple sections and are nested together over the hanger opening and in the general plane thereof.

A further object of this invention is to disclose a hanger having a separate access opening, and closure therefor, to accommodate the tail structure of large aircraft. Accordingly less than the fully available hanger opening is required for smaller aircraft.

A still further object of this invention is to disclose selectively operable means for opening the tail section doors of the hanger closures only when desirable.

Also among the objects of this invention is to disclose a new and novel means of operating the proposed multiple sectioned overhead hanger doors, including operation of the tail section doors when required.

Still further among the objects of this invention is to disclose operating means for the hanger doors which also serve as wind resistant braces and closure locks for such doors.

Numerous other objects and advantages in the practice of this invention will become apparent upon a reading of the following specification, in conjunction with the accompanying drawings.

In the drawings:

FIGURE 1 is a front plan view of an aircraft hanger showing the opening space provided therein and the closure doors disposed thereover.

FIGURE 2 is an inside plan view of the hanger of FIGURE 1 showing the door closures in different opened and partially opened positions, and showing the operating means therefor.

FIGURE 3 is an enlarged cross-sectional view through one set of the disclosed hanger doors to show their general relative disposition when closing the hanger opening.

FIGURE 4 is an enlarged cross-sectional view through a set of the hanger doors as disposed in nested relation beyond the hanger opening space.

FIGURE 5 is a further enlarged plan view of one part of the hanger door operating means.

FIGURE 6 is an enlarged view of the guide means used with the lower hanger door section.

FIGURES 7-9 are pictorial illustrations of several different hanger opening combinations available in the use of the teachings of this invention.

Referring to the drawings in further detail:

The aircraft hanger 10, of FIGURES 1 and 2, is shown to include an access opening 11 closed by sets of hanger doors 12. Each set of hanger doors 12 closes one-half of the access opening 11 and they are in mirrored relation on opposite sides of the centerline across the opening. The hanger door sets 12 each include a lower door section 13, an upper door section 14, and a tail section door 15. The tail section doors 15 are disposed above the upper doors 14 and in adjacent relation on opposite sides of the centerline across the hanger opening. They are smaller in width than the other door sections 13 and 14; being intended to accommodate only the tail structure of a large aircraft, as will be described.

The hanger 10 is shown to include front wall space 16 on each side of the hanger opening 11 within which service entry doors 18 may be provided. The form of the access opening 11 also provides overhead frontal or curtain wall sections 19 on each side of the tail section doors 15 and over the upper hanger door members 14. The door sections 14 and 15 are received in raised and nested relation behind these frontal walls, as will be subsequently described.

In FIGURES 2-5 is shown the operating arms 20 used to activate the hanger doors 13, 14 and 15.

The operating arms 20 are pivotal arm members mounted above the hanger opening 11 and generally in, though slightly behind, the plane thereof. These pivotal arms 20 are of a length equivalent to the height of the hanger 10; or at least such as enables them to extend from their pivotal mounting down across the hanger opening 11 and into engagement with the runway 21 extending through the hanger opening. Their engagement in cam slots 22 formed in the runway enables them to serve as wind resistant braces and closure locks for the doors, as will be subsequently appreciated.

The lower and upper hanger door sections 13 and 14 are engaged to the pivotal arm members 20, as best shown by FIGURE 3. The pivotal arm 20 is shown as a straight arm member by FIGURE 3; though it might well be formed to include stepped bends to be closer to the upper door section 14, for example, or include other means of structure reinforcement for support of the upper door section 14.

The upper door members 14 are engaged to the operating arms 20 by pivotal connections 23. Each upper door member 14 of the different hanger door sets 12 is engaged to a pair of the operating arms 20 to form a parallelogram linkage therewith. This enables the door sections to remain horizontal in the course of vertical and lateral movement by the pivotal operating arms; as will be described.

The lower hanger door sections 13 are also engaged to the operating arm members 20 by pivotal connections, as at 24, in the same general manner and for the same general purpose as the upper hanger doors 14. However, a lost motion connection in the form of an elongated slot 25 in the hanger door, and roller means 26 on the arms 20, is included with the lower door mounting. This is to facilitate a nested relation of the lower and upper doors 13 and 14 next adjacent to overhead frontal walls 19.

The hanger door sections 13 and 14 are shown by FIGURE 3 as being of a solid wall construction. However, they may be of a hollow core, corrugated, or other construction if desired. The lost motion slot 25 may be formed by a bracket attached to the door as well as being formed therein, as disclosed. The doors 13 and 14 do include weather sealing cooperative edges 27 and 28 therebetween. The upper door section also includes a sealing edge 29 cooperating with the lower edge of the frontal walls 19 and of the tail section doors 15.

The operating arms 20 include gear sectors 30 at their upper end. Each pair of arms 20 for each set of hanger doors 12, has its gear sectors in mesh with a common rack bar 31. Accordingly, separate gear drive motors 32 may be employed to reciprocate the rack bars 31 and rotate the gear sectors and operating arms engaged therewith.

The operating arms 20 may be counterbalanced to compensate for the load resistance to which they are subjected. A rocker arm 33, chain 34 and counterweight 35 serve such purpose for the outermost operating beams 20, as shown by FIGURE 2.

In the raising of the lower door section 13 into nested relation with the upper door section 14, behind the frontal curtain wall 19, a guide rail 36 is most useful. Guide rails 36 are mounted inside the hanger 10 and behind the front wall sections 16 on each side of the hanger opening 11. They extend from the lower corner of the hanger opening 11 divergently upward and over the service entry doors 18. Braces 37 space the guide rail the required distance from the wall 16. The lower door sections 13 have both their top and bottom edge engaged to the guide rails 36. The lower edge connection of hanger door 13 to the guide rail 36 may be such as is shown by FIGURE 6. A channel section 38 is formed in the lower corner of the door and includes rollers 39 for smooth operating guide rail engagement. The same general sort of arrangement is used for the upper edge connection on the end of an extension arm 40.

The tail door sections 15 are shown as mounted on the outside of the hanger 10 for lateral movement on horizontal guide rails 41. Roller means 42 mounted on the tail doors and engaged with the guide rail facilitate easier movement of the doors. An overhanging drip shield 43 may be used for weather protection, if desired.

The tail doors 15 are formed to include an elongated vertical slot, flange or other receiving member 44 along their inner side edges. Such receiving members 44 are selectively engaged by solenoid or other selectively operable means 45 provided on the pivotal arm members 20 disposed next adjacent thereto. Accordingly, the selective means 45 may be activated, when desired, for engaging the receiving means 44 on the tail doors to move the doors laterally as the pivotal arms raise the other door sections 13 and 14.

Although detailed drawings of the aforementioned arrangement have not been provided, it is believed that the teaching set forth is quite clear and is adequately illustrated. One suggested detail of this arrangement is however shown by FIGURE 5. Therein, the gear sectors 30 of the centermost operating arms 20 are shown in parallel spaced and overlapping relation with a cutout 46 to avoid interference with the pivotal shaft of the next adjacent arm member. Each gear sector 30 engages a different rack bar 31, as mentioned. This overlapping relation enables the centermost arms 20 to be located closer together. A further detail feature is shown in having the arms 20 include a straight edge from which the tail door engaging means 45 may extend and be disposed closer to the center line of the hanger. The arm 20 swings up and out of obstruction across the tail door opening, as shown by FIGURE 2, while the engagement means 45 is still disposed for tail door activation.

The major different possible combinations of hanger openings which may be provided in the practice of this invention are shown by FIGURES 7–9.

In FIGURE 7 the hanger opening 11 is completely exposed. Accordingly, an airplane 50 having a large wing span and high tail structure is readily accommodated.

In FIGURE 8 only one-half of the hanger access 11 is open, exclusive of the tail doors 15, so that a smaller airplane 60 may be wheeled in or out of the hanger space.

FIGURE 9 shows that both halves of the hanger access 11 may be opened, while the tail doors 15 remain closed, if two airplanes 70 and 80 are to be moved in or out of the hanger at the same time.

*Operation*

The electrical controls for the operation of the disclosed hanger doors have not been shown nor described for the reason that they are reasonably understandable without illustration or example. It should suffice to say that each set of hanger doors 12 is operated by a different pair of control arms 20 and that the pairs of control arms 20 are operated by separate drive motor means 32.

To open one set of hanger doors 12, excluding the tail door 15, and provide the access opening shown by FIGURE 8, only one pair of operating arms 20 are activated. The drive motor 32 moves the rack bar 31 and causes the gear sectors on arms 20 to be rotated. At least one of the operating arms 20 is counter-weighted by means of lever arm 33, chain 34 and counterweight 35.

As the pair of operating arms 20 are rotated on their pivotal axis, they unlock the one set of doors 12 once their free ends clear the floor plate locking slots 22 in the runway 21. Continued rotation of the arms 20 raises the door sections 13 and 14 simultaneously through the partially raised positions as shown at the left in FIGURE 2.

The upper door section 14 follows the path of a parallelogram link under the influence of the pivotal arms 20, and is raised vertically and moved laterally into a housed position behind the frontal curtain wall section of the hanger 10.

To avoid having the lower door section 13 swing out beyond the end of the upper door section 14, under the influence of the operating arms 20, the lost motion connection, comprising the elongated slot 25, enables the lower door to be restrained against undue lateral movement. Such restraint against lateral movement is afforded by the guide members 36. As the arms 20 attempt to raise the lower door sections 13, the rollers 26 on the arms move relatively within the slots 25 towards the outer ends of the door sections. Accordingly, a more vertical than horizontal or lateral movement of the lower doors is obtained. The guide members 36 are so arranged that the lower doors 13 are carried into an overlaying nested relation with the upper doors 14, substantially as shown on the right in FIGURE 2. Both door sections are received behind the frontal walls 19 and beyond the hanger opening 11.

It will be appreciated that either set of hanger doors 12, or both sets, may be activated to provide the single or double size access openings shown by FIGURES 8 and 9.

In those instances in which a large aircraft, such as 50 in FIGURE 7, is to be accommodated in the hanger 10, the tail doors 15 are also opened.

To operate the tail doors 15, the operative means for tail door engagement, 45, provided on the arms 20 traveling therepast, are activated. As mentioned, such means may be solenoid operated or selectively actuated by some such mechanism. The operative means 45, when energized, engages the slot or flange 44 on the tail doors 15.

Subsequent pivotal travel of the arms 20 involves a lateral movement of the tail door activating means 45, to open the tail doors, and a relative free vertical travel which does not affect the tail doors. Accordingly, both tail doors 15 and both hanger door sets 12 may be opened at the same time to provide a full and complete opening of the hanger access for large planes.

I claim:

1. Aircraft hanger doors for closing a hanger opening, and comprising; a right and a left hand set of hanger doors, each of said set of hanger doors including an upper and a lower door section, and separate operator arm members engaged to said different sets of doors and pivotal in a parallel plane therewith in opposite directions for vertically raising said lower door into nested parallel spaced relation with said upper door and both of said door sections from obstruction of said hanger opening in the course of arcuate travel thereof.

2. An aircraft hanger, comprising; a front wall having an opening provided therein and receptive of aircraft therethrough, said opening being substantially the height of said hanger, curtain type frontal walls closing the upper and outer corner areas of said opening and providing an aircraft access including a wing receptive space across said opening and a tail receptive space centered over said wing receptive space, sets of hanger doors for closing said wing and tail receptive spaces and disposed on opposite sides thereof, said hanger door sets including overhead opening door sections for closing half of said wing receptive space and a sliding door section for closing at least half of said tail receptive space, and operative means interconnected to said sets of hanger doors for nesting said door sections in parallel spaced relation to and behind said frontal curtain walls.

3. Aircraft hanger doors for closing at least part of a hanger opening, and comprising; a pair of overhead opening door sections arranged in parallel stepped edge engaging relation, a pair of pivotal arm members operable in parallel spaced relation to the planes of said door sections and having said door sections engaged in parallelogram forming relation therewith, a lost motion connection provided between the lower of said door sections and said arm members and permitting relative lateral movement thereof, and vertically disposed guide means having said lower door section engaged thereto for lateral adjustment thereof relative to said upper door section in the course of vertical movement thereof within the limits of said lost motion connection.

4. Aircraft hanger doors for closing a hanger opening, and comprising; two sets of hanger doors in mirrored relation on opposite sides of said hanger opening, said sets each including a lower and an upper door section and a tail section door, pivotal arm members mounted over said hanger opening and engaged to different of said sets of hanger doors, said arm members being pivotal in the general plane of said larger opening, said upper door sections being pivotally secured to said arm members for vertical and lateral adjustment thereof in the course of pivotal arm movement, said lower door sections including a lost motion pivotal connection with said arm members for similar vertical and lateral adjustment thereof, and guide means engaging said lower door section and directing it into nested relation with said upper door section removed from said hanger opening, said arm member further including means of optional engagement with said tail section doors, and means of laterally moving said tail section doors in the course of raising said upper and lower hanger doors.

5. Aircraft hanger doors for closing a hanger opening, and comprising; two sets of hanger doors for closing said opening and disposed on opposite sides of the centerline thereof, said sets of hanger doors being independently operable to selectively open half and all of said hanger opening, counterbalanced pivotal arm members mounted over said hanger opening and extending to the bottom thereof, the free ends of said arm members extending in locking engagement with the runway through said hanger opening, said sets of hanger doors including a lower door section having an upper door section thereabove and a tail section door further thereabove, pivotal means engaging said upper and lower door sections of different of said door sets to different of said pivotal arm members, a lost motion pivotal connection provided between the lower of said door sections and said pivotal arm members, guide means mounted in said hanger and extending divergently upwardly along the side said hanger opening, said lower door sections being engaged with said guide means for directed travel into nested relation with said upper door sections as raised therewith by said pivotal arm members, selectively operative means for engaging said tail section doors provided between said tail section doors and said pivotal arm members, and lateral guide means afforded said tail section doors as activated by said pivotal arm members, said pivotal arm members including gear sector drive means engaged and driven in pairs by rack and pinion drive means.

6. Aircraft hanger doors for closing an opening provided in an aircraft hanger, and comprising; two sets of hanger doors disposed in mirrored relation to each other and being independently operable to selectively open half and all of said hanger opening, said sets of doors including a lower door section having an upper door section disposed thereabove and in edge sealing engagement thereto, said sets also including a laterally guided tail section door disposed in edge sealing engagement above said upper door section, counterbalanced pivotal arm member mounted over said hanger opening and operative in the general plane thereof, said arm members being disposed in pairs and each of said pairs being operatively engaged to one of said sets of hanger doors for raising and lowering said doors vertically in the course of pivotal movement thereof, a lost motion connection provided between said lower door sections and said pivotal arm members permitting relative horizontal movement of said lower door sections in the course of vertical movement thereof, guide means engaging said lower door sections for directing them into nested relation with said upper door sections as removed from said hanger opening, selectively operative means provided between said tail section doors and one each of said pairs of pivotal arm members for interengagement therebetween to open said tail section doors in the course of pivotal arm movement, and the ends of said pivotal arms being receivable in interlocking engagement with the runway extending through said hanger opening for holding said hanger doors in wind-braced and closed relation within said hanger opening.

7. Aircraft hanger doors for closing a hanger opening including separate wing and tail section accesses, and comprising; two sets of hanger doors in mirrored relation on opposite sides of the centerline of said hanger opening, each set of said hanger doors including upper and lower door sections closing said wing accesses and a tail section door closing said tail section access, vertically disposed and laterally inclined guide means having said upper and lower door sections engaged thereto, said upper and lower door sections including means of simultaneous vertical and lateral adjustment permitting a parallel nested relation thereof, and operative means engaging said hanger door sets for vertical and lateral actuation of said upper and lower door sections of one of said hanger door sets into nested relation removed from said wing and tail section accesses and selective lateral actuation of said tail section door in the course thereof.

8. The hanger doors of claim 7, wherein; said operative means include actuator arms pivotally mounted over said hanger opening and extended vertically thereacross for locking engagement with the base sill of said hanger opening and arcuate travel for nesting said upper and lower hanger door sections as recited.

9. Aircraft hanger doors as provided for by claim 1, having separate tail section doors included in said sets of hanger doors and disposed over said upper door sections for closing a tail section opening in said hanger, and selectively operable means for engaging said pivotal arms to said tail section doors for lateral movement thereof in the course of arm movement and nesting of said tail section doors behind said nested upper and lower door sections.

10. Aircraft hanger doors as provided for by claim 1, and having said arm members and lower door sections including lost motion interconnecting means affording relative lateral movement between said upper and lower door sections for disposing said lower door sections in parallel spaced relation behind said nested upper door section.

References Cited in the file of this patent

UNITED STATES PATENTS

| | | |
|---|---|---|
| 216,035 | Goodwin | June 7, 1879 |
| 856,369 | Ritter | June 11, 1907 |
| 1,250,992 | Dost | Dec. 25, 1917 |
| 1,375,391 | Johnson | Apr. 19, 1921 |
| 1,832,966 | Cook et al. | Nov. 20, 1931 |
| 2,522,158 | Bauers et al. | Sept. 12, 1950 |
| 2,586,792 | Davidson | Feb. 26, 1952 |